April 25, 1967   N. B. KELL   3,316,533
VEHICLE TURN SIGNAL SYSTEM
Filed April 16, 1964
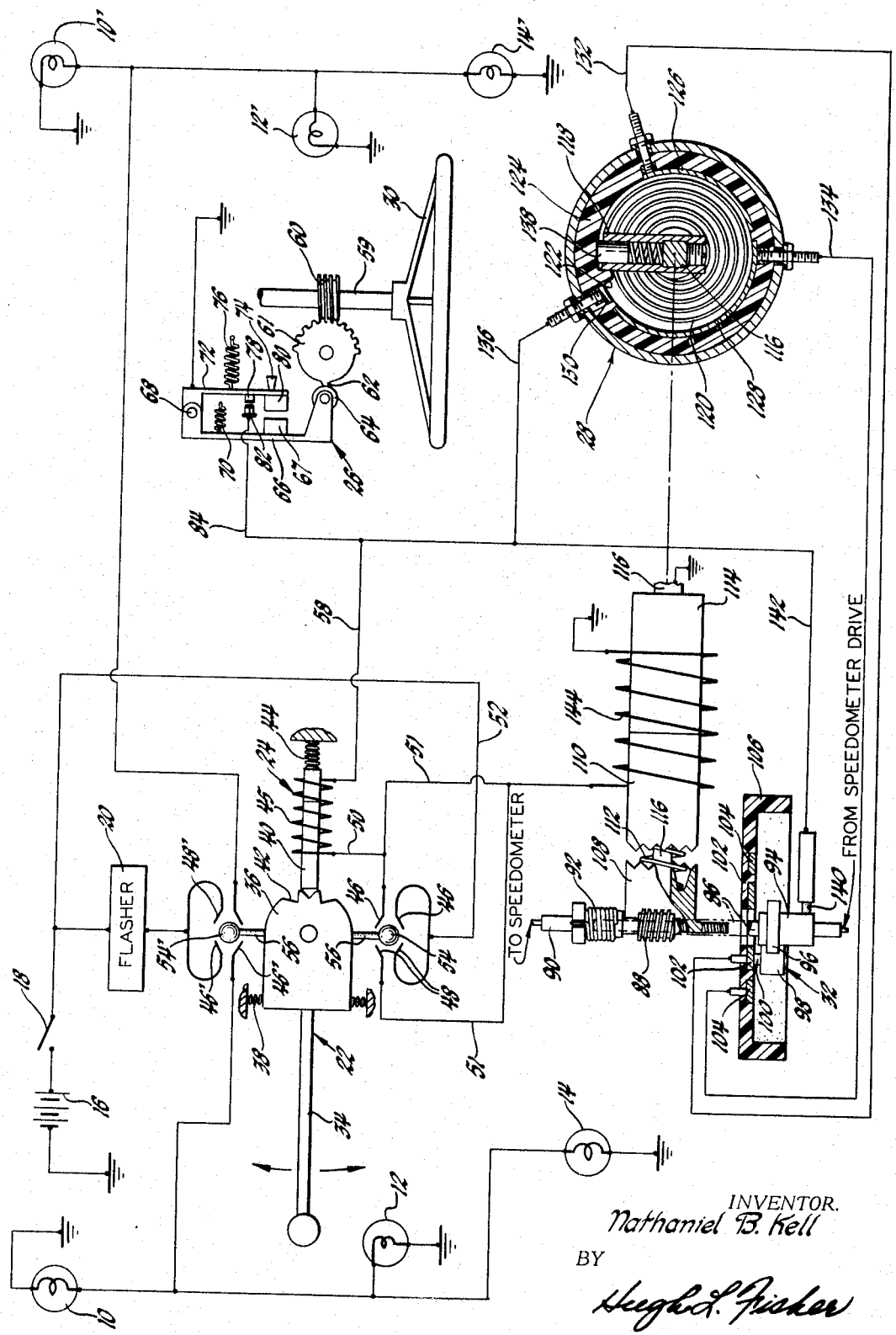
INVENTOR.
Nathaniel B. Kell
BY
Hugh L. Fisher
ATTORNEY

United States Patent Office 3,316,533
Patented Apr. 25, 1967

3,316,533
VEHICLE TURN SIGNAL SYSTEM
Nathaniel B. Kell, Indianapolis, Ind., assignor to General Motors Corporation, Detroit, Mich., a corporation of Delaware
Filed Apr. 16, 1964, Ser. No. 360,349
9 Claims. (Cl. 340—56)

This invention relates in general to electrical control circuits and more particularly to an electrical control circuit for controlling the energization of motor vehicle turn indicating lamps.

One of the primary disadvantages of the turn signal systems of the prior art is the manner in which the signal is canceled after the turn is made. Conventionally, a mechanical canceling device is employed which is mounted in a suitable manner to the vehicle steering shaft or steering wheel and adapted to return the turn signal actuator to a neutral position if the steering wheel is rotated sufficiently to turn the vehicle through an arc of approximately 90°. It will be apparent that under various driving conditions this type of mechanical cancellation is ineffective. In particular, when an automobile is traveling on a multi-lane superhighway and has occasion to either turn therefrom or to change lanes thereon, the turns are generally of a small magnitude and it is quite likely that a mechanical canceling device would not be rotated sufficiently to deenergize the system.

In accordance with the present invention, a turn signal system is provided which incorporates a plurality of canceling means adapted to independently deenergize the system under predetermined conditions. More particularly, the present invention provides a plurality of switching means for controlling electromechanical detent means thereby deenergizing the signal system in response not only to a predetermined amount of rotation of the vehicle steering wheel but also in response to the distance traveled by the vehicle after energization of the turn signal system. Furthermore, the distance responsive switching means is adapted to be modulated in accordance with the speed of the vehicle.

The turn signal system of the present invention may be manually operable in the same manner as presently used turn signal systems but the components may be assembled into modular units which are easily accessible for service or replacement.

A more complete understanding of the present invention may be had from the following detailed description which should be read in conjunction with the drawing in which the figure is a circuit diagram of a turn signal system including a schematic representation of a plurality of switch operating mechanisms.

Referring to the drawing, left and right indicating lamps 10, 12, 14 and 10', 12' and 14', respectively, are adapted to be selectively energized from a source 16 through an ignition switch 18 and a flasher 20 by a turn signal mechanism generally designated 22. The mechanism 22 is manually operable to either the left or right turn indicating position and is releasably maintained in either the neutral or turn indicating position by a solenoid generally designated 24. The solenoid 24 is normally deenergized when the mechanism 22 is in a neutral position but is adapted to be connected across the source 16, when the turn signal mechanism 22 is actuated to either a left or right turn indicating position, by means of condition responsive switches generally designated 26 and 28, respectively. The switch 26 is adapted to be closed in response to predetermined rotation of the vehicle steering wheel 30. The switch 28 is adapted to be closed in response to a predetermined distance traveled by the vehicle with the distance being varied in accordance with the vehicle speed by means of a speed responsive switch generally designated 32.

The turn signal mechanism 22 comprises a lever 34 adapted to manually move a lever assembly 36 against the bias of spring 38 from a neutral position as shown to either a left or right turn indicating position in which position the lever assembly 36 is releasably maintained by engagement of the plunger 40 of the solenoid 24 with the notches 42 formed in the lever assembly 36. A spring 44 exerts a sufficient force on the plunger 40 to retain the lever 34 in either a left or right turn indicating position against the force of the springs 38. This arrangement acts as a mechanical detent allowing the lever 34 to be manually moved to any position with no electrical power being required for holding the lever 34 in a selected position. It will be noted that the solenoid winding 45 has one end connected to the battery 16 through conductors 50, 51, either of two sets of stationary contacts 46 and 48 and conductor 52. The stationary contacts 46 and 48 are adapted to be bridged by a movable contact 54 which is carried by an insulating plate 56 attached to the lever 34. Similarly, the stationary contacts 46' and 48' are adapted to be bridged by the movable contact 54' to either connect the left or right turn indicating lamps to the flasher 20. The other side of the solenoid winding 45 is connected by a conductor 58 to the condition responsive switches 26 and 28 connected in parallel to ground.

As indicated previously, the switch 26 is responsive to rotation of the steering wheel 30. The steering wheel 30 is connected to the vehicle steering shaft 59 which carries a worm 60 driving a cam gear 61 which carries a cam 62. The cam 62 is adapted to engage a roller 64 mounted on a follower arm 66. The follower arm 66 carries a magnet 67 and is pivotally mounted about the pin 68 and is maintained in the position shown against the bias of a spring 70 when the vehicle is traveling in a straight line. A contact arm 72 is also pivotally mounted on the pin 68 and is adapted to rotate independently of the follower arm 66 and is normally maintained against a stop 74 by a spring 76. The contact arm 72 is grounded and carries a contact 78 and an armature 80. A stationary contact 82 is connected by a conductor 84 and the conductor 58 to the solenoid winding 45.

When the vehicle is steered in a straight path, cam gear 61 is in the position shown with the roller 64 on the peak of the cam 62. If the steering wheel 30 is rotated an appreciable amount in either direction, cam 62 moves away from the roller 64. This permits follower arm 66 and magnet 67 to rotate counterclockwise about the pin 68 because of the tension of spring 70. When the magnet 67 gets sufficiently close to the armature 80, magnetic attraction will cause the armature 80 to move into contact with the magnet 67. This will rotate contact arm 72 in a clockwise direction. The spring 76 is adjusted to a tension that will delay the attraction of armature 80 to the magnet 67 until the magnet is sufficiently close to the armature 80 to prevent the contact 78 from reaching the contact 82. Thus there is no electrical contact between contacts 78 and 82 while a turn is being made.

When the steering wheel 30 is returned to a straight line position, cam 62 returns to the position shown in the drawing. During the return of the cam 62, roller 64 and follower arm 66 rotate clockwise about the pin 68. Armature 80 being magnetically attached to magnet 67 causes contact arm 72 to be rotated clockwise about the pin 68. During the latter part of the clockwise rotation, the contact 78 engages stationary contact 82 which stops the rotation. Follower arm 66 continues to rotate until the tension of the spring 76 exceeds the magnetic attraction between the magnet 67 and the armature 80. Contact arm 72 then returns against the stop 74 breaking its electrical contact with contact 82. Thus, electrical contact between contacts 78 and 82 is made and then broken during return of the steering wheel 30 to a straight line position.

The speed-distance-cancel unit includes the switches 28 and 32 and is adapted to be connected to the motor vehicle speedometer drive system. The vehicle speedometer drive connected to a drive input shaft 86. Worm 88 is rotatably mounted on the shaft 86 and positioned by output shaft 90 which is fixed to the shaft 86. Grip spring 92 is fixed at one end to the output shaft 90. The free end of grip spring 92 fits the circumference of the hub of worm 88 and will rotate freely thereon in only one direction. In the other direction the spring 92 wraps onto and grips the worm 88. Thus, the system is not affected by travel of the vehicle in reverse direction.

Slip ring 94 is bonded by insulating material to the input shaft 86. Governor spring 96 is attached to the slip ring 94 at one end and to governor weight 98 at the opposite end. A carbon brush 100 is slidably fitted into the weight 98 against a spring (not shown). The brush 100 extends from the weight 98 and contacts inner contact ring 102, outer contact ring 104 or insulating material 106. The speed of input shaft 86 and the resulting position of the governor weight 98 moved by centrifugal force against the spring 96 determines the position of the weight 98 and the carbon brush 100.

The worm 88 drives a gear 108 which is normally spring biased out of engagement wth a clutch sleeve 110 which is toothed on one end and abuts a solenoid core 114 at the other end. The solenoid core 114 is slidably mounted on a square section of a shaft 116 which rotatably supports the gear 108. A brush holder 118 and the inner end of a spiral spring 120 are fixedly mounted on the square section of the shaft 116. The spiral spring 120 is prewound to normally provide sufficient torsion to hold shaft 116 in the position shown so that brush holder 118 rests against a lug 122 which projects inward from an insulating ring 124.

The insulating ring 124 carries a plurality of arcuate contact segments 126, 128 and 130 which are connected with conductors 132, 134 and 136, respectively. The brush holder 118 carries a brush 138 for sequentially grounding the contact segments 126, 128 and 130 in response to predetermined rotation of the shaft 116. The conductor 136 is connected to one side of the solenoid winding 45 while a brush assembly 140 and conductor 142 connect conductors 132 and 134 to the solenoid winding 45 through the inner and outer contact rings 102 and 104, brush 100, governor weight 98, spring 96 and slip ring 94.

The solenoid winding 144 is adapted to be connected across the battery 16 when the turn signal lever 34 is moved to either a left or right turn indicating position by the closing of the stationary contacts 46 or 48 by the movable contact 54 at which time the clutch sleeve 110 is moved into engagement with the gear 108 by the solenoid core 114 causing rotation of the shaft 116 and the brush holder 118. At predetermined distances traveled after the turn signal mechanism 22 has been actuated to a left or right turn indicating position, the brush 138 will respectively ground either contact segment 126, 128 or 130 depending on the position of the contact 100 as determined by the vehicle speed.

Operation

If the driver wishes to indicate a left turn, a lever 34 is moved in a counterclockwise direction connecting the left turn indicating lamps 10, 12 and 14 with the battery 16 through movable contact 54', stationary contacts 46' and the flasher 20 thereby providing an intermittent energization of the lamps 10, 12 and 14. Simultaneous with closing of the contacts 46' is the closing of stationary contacts 46 by movable contact 54 which connects one end of solenoid winding 45 with the battery 16 through conductors 50, 51 and 52. This also connects solenoid winding 144 across the source 16 through conductors 51 and 52 causing solenoid core 114 to move clutch sleeve 110 into engagement with the toothed hub of gear 108. Shaft 116 and brush holder 118 then begin to rotate in a clockwise direction.

When the vehicle speed is low, the other end of solenoid winding 45 is connected to the segment 126 through conductors 58, 142, brush assembly 140, slip ring 94, governor 96, 98, contact 100, contact ring 102 and conductor 132. The solenoid 24 will be energized to retract the plunger 40 allowing the return of the mechanism 22 to a neutral position when the brush 138 contacts segment 126.

If, however, the vehicle exceeds the speed at which governor spring 96 will hold governor weight 98 in the area of inner contact ring 102, the circuit will change and the current path will be from brush 100 to outer contact ring 104 through conductor 134 and contact segment 128. A further increase in vehicle speed will cause governor weight 98 and brush 100 to swing beyond the outer circumference of outer contact ring 104 and onto the insulating surface of insulator 106. Thus, the governor is responsive to three speed ranges. In the low speed range the solenoid 24 is energized through segment 126. In the intermediate speed range the solenoid 24 is energized through segment 128. In the high speed range the circuit through the speed responsive switch 32 is broken and the solenoid 24 is energized through conductors 58, 136 and segment 130. Thus, energization of the solenoid 24 and consequent return of the mechanism 22 to a neutral position depends upon whether the vehicle continues in a virtually straight path, how far it travels and at what speed it travels.

If a left or right turn of sufficient sharpness is made before brush 138 (which began rotating clockwise when the turn signal was activated) reaches contact segment 126 (if speed is low) or contact segment 128 (if speed is intermediate) or contact segment 130 (if speed is high), the solenoid 24 will be connected across the source 16 through the contacts 78, 82 by return of the steering wheel 30 to a straight line position as previously described when the steer-cancel switch assembly was explained. However, should no appreciable turn be made, the circuit will be completed when brush 138 reaches contact segment 126 (at low vehicle speed) or contact segment 128 (at intermediate vehicle speed) or contact segment 130 (at high vehicle speed).

When the solenoid 24 is grounded the plunger 40 is moved rightward out of the notches 42 of lever assembly 36 in which it was engaged. This releases the lever assembly 36 and the spring 38 will return it to the mid-position shown. When this occurs, movable contacts 54, 54' open contacts 46 and 46' to interrupt the circuit to the lamps 10, 12 and 14 and to the solenoid 144. Spring 112 will push solenoid core 114 and clutch ring 110 rightward disengaging the teeth of clutch ring 110 from the teeth of driven gear 108. The spiral spring 120 will rotate the shaft 116 counterclockwise. This will return brush holder 118 to the position shown resting against the lug 122 of insulating ring 124. The teeth on gear 108 and clutch ring 110, because of the inclined tooth form, will slip if lever 34 is manually held in a signaling position too long or if, by electrical failure, solenoid 24 does not act. This arrangement insures against twisting and damage to the cable coming from the speedometer drive.

If the driver were to indicate a right turn, the contacts 48 and 48' are closed by movement of the lever 34 in a clockwise direction thus intermittently energizing lamps 10', 12', and 14' and also energizing the solenoid 144. The system then operates in the same manner as previously described.

It will be understood that the lever 34 may be moved manually at any time to any position to override any automatic action which may have started and reset the entire mechanism.

While the invention has been described with respect to a particular embodiment, it is not to be construed in a limiting sense. Many modifications and variations will now occur to those skilled in the art. For a definition of the invention, reference is made to the appended claims.

I claim:

1. A motor vehicle turn signal system comprising first switching means movable between a neutral position and an operative position and normally biased to said neutral position, electromechanical detent means for releasably maintaining said first switching means in said operative position, second switching means for releasing said detent means in response to a predetermined rotation of the steering shaft of said vehicle, third switching means operative independently of said second switching means for releasing said detent means in response to a predetermined distance of travel of said vehicle, release of said detent means permitting said first switching means to return to said neutral position.

2. A motor vehicle turn signal system comprising first switching means movable between a neutral position and an operative position and normally biased to said neutral position, electromechanical detent means for releasably maintaining said first switching means in said operative position, second switching means for releasing said detent means in response to a predetermined rotation of the steering shaft of said vehicle, third and fourth switching means operative independently of said second switching means for releasing said detent means in response to rotation of the speedometer drive of said vehicle, said third switching means being responsive to the speed of rotation of said speedometer drive, said fourth switch means being responsive to the number of revolutions of said speedometer drive, release of said detent means permitting said first switching means to return to said neutral position.

3. A motor vehicle turn signal system comprising manually operative switching means movable between a neutral position and an operative position and normally biased to said neutral position, electromechanical detent means for releasably maintaining said manually operative switching means in said operative position, second switching means for releasing said detent means in response to a predetermined rotation of the steering shaft of said vehicle, third switching means operative independently of said second switching means for releasing said detent means in response to a predetermined distance of travel of said vehicle, release of said detent means permitting said manually operative switching means to return to said neutral position.

4. A motor vehicle turn signal system comprising first switching means movable between a neutral position and an operative position and normally biased to said neutral position, electromechanical detent means for releasably maintaining said first switching means in said operative position, second switching means operative for releasing said detent means in response to a predetermined distance of travel of said vehicle, release of said detent means permitting said first switching means to return to said neutral position.

5. A motor vehicle turn signal system comprising first switching means movable between a neutral position and an operative position and normally biased to said neutral position, electromechanical detent means for releasably maintaining said first switching means in said operative position, second switching means for releasing said detent means in response to a predetermined rotation of the steering shaft of said vehicle, third switching means operative independently of said second switching means for releasing said detent means in response to a predetermined distance of travel of said vehicle, fourth switching means responsive to the speed of said vehicle, said third switching means being responsive to actuation of said fourth switching means whereby the release of said detent means is dependent on both speed and distance traveled of said vehicle.

6. A motor vehicle turn signal system comprising a turn signal actuating mechanism, electromechanical detent means adapted to releasably maintain said mechanism in either an operative or a neutral position, said mechanism adapted to return to said neutral position from an operative position upon release of said detent means, cam means rotatable with the motor vehicle steering shaft, a cam follower mounted in spaced relationship with said shaft and normally spring biased in a first direction and movable in an opposite direction in response to rotation of said shaft in either a clockwise or counterclockwise direction, a magnet mounted on said cam follower, a stationary contact, a movable contact arm mounted in spaced relationship with said shaft and spring biased in said first direction, predetermined rotation of said shaft in a clockwise direction from the normal straight line position causing said magnet to engage said contact arm but to maintain said stationary contact and said contact arm out of engagement, subsequent rotation of said shaft in a counterclockwise direction causing said contact arm to be carried into engagement with said stationary contact prior to disengagement of said magnet and said contact arm to thereby release said detent means.

7. A motor vehicle turn signal system comprising a turn signal actuating mechanism, electromechanical detent means adapted to releasably maintain said mechanism in either an operative or a neutral position, said mechanism adapted to return to said neutral position from an operative position upon release of said detent means, cam means rotatable with the motor vehicle steering shaft, a pivot pin mounted in spaced relation with said shaft, a cam follower pivotally mounted on said pin and normally spring biased in a first direction but pivotal in an opposite direction in response to rotation in either a clockwise or counterclockwise direction, a magnet mounted on said cam follower, a stationary contact, a contact arm pivotally mounted on said pin and spring biased in said first direction, a movable contact mounted on said contact arm, predetermined rotation of said shaft in a clockwise direction from the normal straight line position causing said magnet to engage said contact arm while maintaining said stationary and movable contacts out of engagement, subsequent rotation of said shaft in a counterclockwise direction causing said cam follower and said contact arm to pivot in said opposite direction to engage said movable contact with said stationary contact prior to disengagement of said magnet from said contact arm to thereby release said detent means.

8. A motor vehicle turn signal system comprising first switching means movable between a neutral position and an operative position and normally biased to said neutral position, electromechanical detent means for releasably maintaining said first switching means in said operative position, movable contact means, drive means coupling said movable contact means to the vehicle speedometer drive for rotating said movable contact means in response to rotation of said speedometer drive, a plurality of stationary contacts, vehicle speed responsive means for selectively connecting said detent means to one of said plurality of stationary contacts, said movable contact means adapted to sequentially engage said stationary contacts to release said detent means.

9. A motor vehicle turn signal system comprising a turn signal actuating mechanism movable between a neutral position and an operative position, electromechanical detent means adapted to releasably maintain said mechanism in either an operative or neutral position, said mechanism adapted to be returned to said neutral position from an operative position upon release of said detent means, a rotatable contact, solenoid means, drive means coupling said rotatable contact to the vehicle speedometer drive in response to energization of said solenoid means, said solenoid means being energized in response to movement of said actuating mechanism to an operative position, a plurality of stationary contacts, means responsive to the speed of rotation of said speedometer drive for selectively connecting said detent means to one of said plurality of stationary contacts, said rotatable contact adapted to sequentially engage said stationary contacts to release said detent means.

References Cited by the Examiner

UNITED STATES PATENTS

| | | | |
|---|---|---|---|
| 2,186,766 | 1/1940 | Metcalf | 340—54 |
| 2,308,097 | 1/1943 | Murray | 340—56 |

NEIL C. READ, *Primary Examiner.*

A. H. WARING, *Assistant Examiner.*